Dec. 6, 1966  W. G. KIRBY ET AL  3,290,559
MODULAR ASSEMBLY FOR FUNCTIONAL ELECTRONIC BLOCKS
Filed June 16, 1964  3 Sheets-Sheet 2

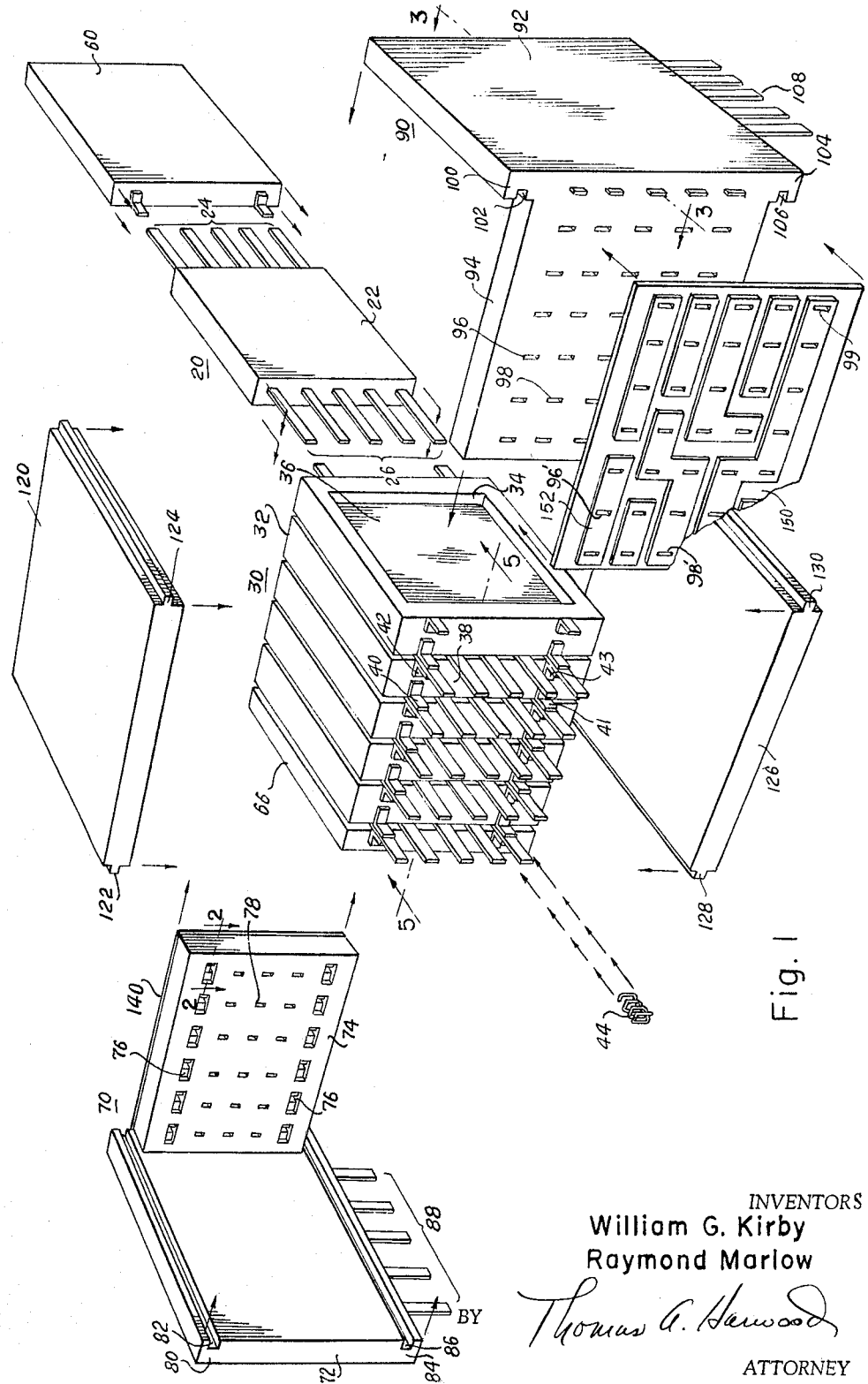

INVENTORS
William G. Kirby
Raymond Marlow, Jr.

BY Thomas G. Harwood
ATTORNEY

Dec. 6, 1966   W. G. KIRBY ET AL   3,290,559
MODULAR ASSEMBLY FOR FUNCTIONAL ELECTRONIC BLOCKS
Filed June 16, 1964   3 Sheets-Sheet 3
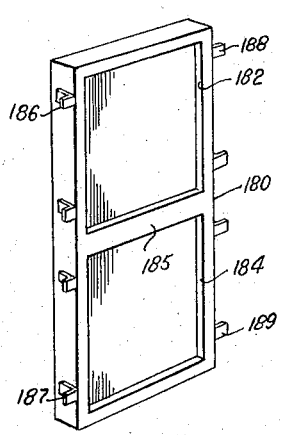
Fig. 9
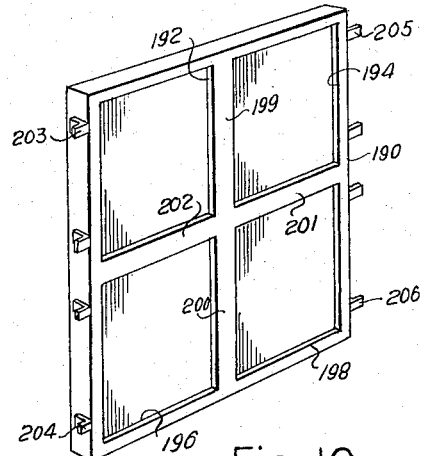
Fig. 10
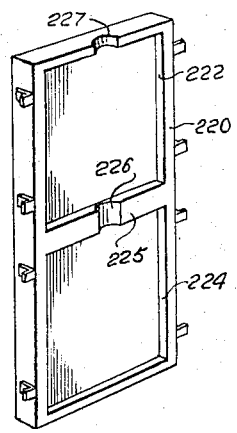
Fig. 11
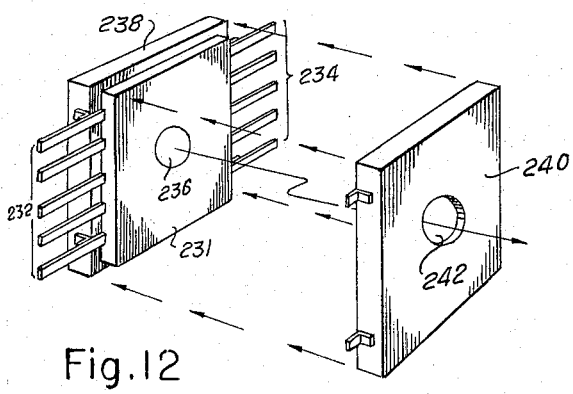
Fig. 12
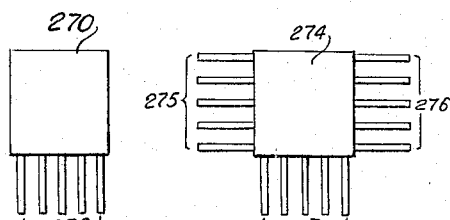
Fig. 14   Fig. 15
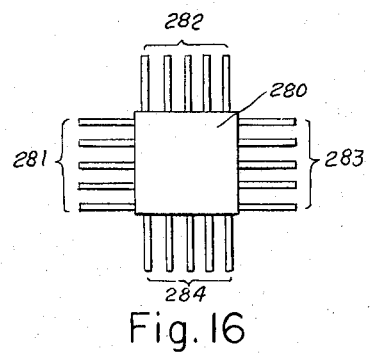
Fig. 16
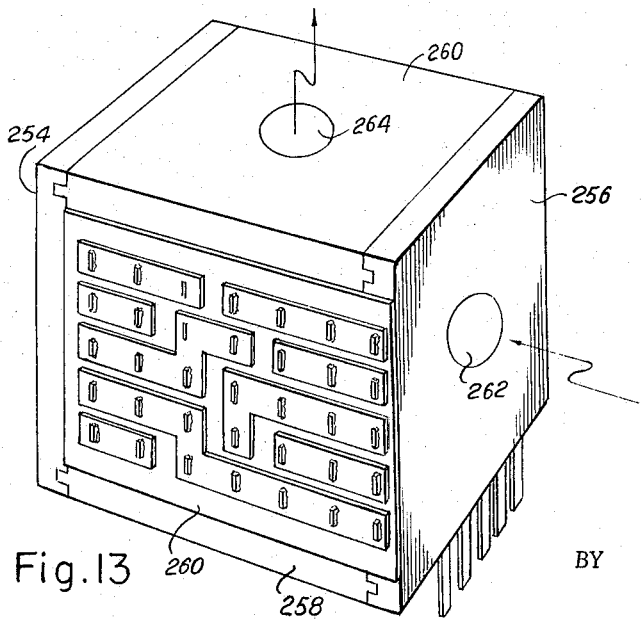
Fig. 13
INVENTORS
William J. Kirby
Raymond Marlow
BY Thomas G. Harwood
ATTORNEY

United States Patent Office 3,290,559
Patented Dec. 6, 1966

3,290,559
MODULAR ASSEMBLY FOR FUNCTIONAL
ELECTRONIC BLOCKS
William G. Kirby and Raymond Marlow, Dallas, Tex.,
assignors to International Energy Conversion, Inc., Garland, Tex., a corporation of Texas
Filed June 16, 1964, Ser. No. 375,608
7 Claims. (Cl. 317—101)

This invention relates generally to the assembly of electronic circuitry and more particularly to the assembly of miniature electronic subassemblies into a module for performing desired electronic functions.

Miniature electronic systems are increasingly replacing conventional circuits in many applications. Probably the most advanced of these systems is what is generally known as the functional electronic block, which comprises an integrated circuit, preferably entirely solid-state in character, taking the form of a small package or block having electrodes protruding therefrom for connection into other circuitry. Such miniature packages are normally designed to perform certain desired functions as an electronic subassembly, such as, for example, amplifiers, digital function subcircuits, oscillators and various other functions. Such applications require that the functional electronic block be connected into other circuitry and, quite probably, interconnected with other miniature blocks of a similar character for performing a combined electronic function. Various problems are encountered, however, not only in the assembly and interconnection of the miniature electronic subassemblies with other electronic circuitry, but in terms of the number or density of functional electronic blocks that can be assembled into a given volume. The latter is a problem because of the heat generated by the blocks and the difficulty in removing the heat from such a small volume to maintain proper functional operation. The extent of this problem becomes more apparent when it is considered that the overall dimensions of functional electronic blocks are only fractions of an inch, which results in a very small total surface area for heat removal and dissipation. In fact, the heat removal becomes acute in some cases where the total amount of power generated within the functional electronic block is of the same order of magnitude as a conventional electronic circuit which performs an equivalent electronic function.

Because of the small dimensions of miniature functional electronic blocks, their assembly and electrical interconnection with other circuitry is difficult and, in at least one sense, resolves itself into a problem of physically being able to work with the package. To meet this problem, various schemes have been devised for the assembly of miniature electronic blocks with electronic circuitry to provide some combined electrical function. The economical replacement of a failed block in such combined systems without damage to the other functional blocks to which it is connected is very important, however, since most miniature electronic blocks are very expensive. In most, if not in all of these schemes, failure of one of the functional electronic blocks within a combined system results in the lost of the entire system because of the lack of provision for the replacement of one block without undue effort or damage to the others. In particular, several functional electronic blocks are interconnected and potted in an epoxy or plastic to achieve high density packaging and some adaptability to temperature stabilization and control. However, replacement of a single failed block within the assembly is precluded, and any temperature control is fair, at best. Interconnection of functional electronic blocks on conventional printed circuit boards does not provide high density packaging in accordance with the miniaturized module concept, and the necessity of bending the leads of the blocks as they are installed on the circuit board reduces the reliability of the circuit.

Besides performing electronic functions by purely electronic means, the functional electronic block is sometimes equipped to perform electronic functions through the use of other physical phenomena, such as optics, for example. Optical radiation sources coupled with photosensitive detectors can provide complete electrical isolation within a block or between two blocks where necessary. This makes possible the provision of impedance matching means and equivalent transformer functions which would not otherwise be possible to provide in such miniature systems. However, very little, if any, consideration has heretofore been given to the solution of assemblying functional electronics into other systems to provide for optical coupling.

Many other problems have been encountered in the assembly and reliable use of miniature functional electronic blocks as are readily recognized by those skilled in the art, wherein specific problems have been enumerated above for the purpose of showing the necessity for an improved modular assembly. All of this points to the fact that, although considerable effort has been expended in the development of miniature functional electronic blocks, very little effort has been expended in the successful physical adaptation of these systems to circuitry to perform the functions for which they are designed.

Among the various objects of the invention are the provision of a modular assembly which is compact, the the elimination of any necessity of bending the leads of functional electronic blocks which would result in damage and non-reliability, the provision of a modular assembly permitting the variation in the number and arrangement of functional electronic blocks per package, the easy removal of a functional electronic block for replacement or repair, simplicity of assembly of the blocks in a modular assembly, ready adaptability of a modular assembly to temperature control and stabilization with a minimum of power, the provision of modular asesmblies adapted to be interconnected by optical coupling, if desired, and in one embodiment, the provision of means for providing temperature control and stability, and the provision of a modular assembly having a cost small as compared to the cost of the electronic block assembled therewithin. Thus, the difficulties alluded to above are eliminated or reduced, in addition to which, additional desirable features are provided as will be seen hereinafter. To elaborate further, the modular assembly of the invention is characterized by a very simplified means of assemblying miniature functional electronic blocks, which greatly reduces the problem of physically handling such small assemblies. Because of the versatility of the modular assembly of the invention, a wide variety of different electrical connections between functional electronic blocks can be made to provide for almost any desired combined electronic function. Thus, the name modular assembly. In addition, failure of one of the functional electronic blocks does not result in the loss of the entire modular assembly of the invention, since because of the modular assembly structure, the functional electronic block that has failed can be readily and economically removed, and replaced or repaired. An additional feature of one embodiment of the invention is the provision of means for cooling, heating and/or temperature stabilization of an entire modular assembly comprised of several interconnected functional electronic blocks. This means is quite miniaturized itself to be consistent with the concept of miniaturization, and is characterized by an adequate cooling or heating capacity for maintaining the temperature of the modular assembly within the desired operating range. Still further, the modular assembly of the invention is adapted in some embodiments, not only for the electrical interconnection of functional electronic blocks but the optical connection thereof.

The above features and advantages, in addition to others, are provided by the invention in a modular assembly whereby a plurality of functional electronic blocks are each disposed between electrically insulating covers to form a subassembly with the electrodes of the blocks protruding therefrom. The blocks are assembled in this manner adjacent each other, so that the subassembly comprises several of the covers with the blocks interleaved therebetween to form a compact structure. This subassembly is held together by a simplified means of securing the protruding electrodes of each block to the covers between which it is encapsulated, with each intermediate electronic block sharing its covers with adjacent blocks. An electrically insulating outer cover defining a plurality of apertures corresponding, respectively, to at least some of the protruding electrodes is fitted against the side of the subassembly from which electrodes protrude with the electrodes passing through the apertures. Prefabricated electrically conducting paths are provided on the outer surfaces of the outside cover for the connections of the electrodes thereto, whereby the configuration which the paths define is selected to provide the desired electrical interconnection of the various functional electronic blocks. The conducting paths are connected to additional electrodes protruding from the outside cover to provide the means for connecting the entire assembly into other circuitry, such as by plugging the additional electrodes into a socket. As will be seen hereinafter, the subassembly comprising the inner covers and the functional electronic blocks have utility in of themselves as a package for the assembly of a desired member of blocks, whereby this package can be adapted to any desired scheme of interconnection with other circuitry.

In one embodiment, means for cooling, heating and/or temperature stabilizing the entire assembly of functional electronic blocks is provided, and preferably comprises a thermoelectric cooler contained within another electrically insulating cover which fits against the bottom of the assembly between the ends of the outside covers. In such case, the inner covers between which the electronic blocks are interleaved provided good thermal contact with the blocks to promote the efficient transfer of heat to the cooler, wherein the inner covers are preferably comprised of a good thermal conducting material which also provides electrical insulation between adjacent blocks. Moreover, the outer covers are preferably comprised of a good thermal insulating material which precludes any substantial heat flow between the electronic blocks and the ambient except through the heating and cooling means provided. This increases the efficiency of the overall heating and/or cooling operation. Where heating and cooling, or temperature stabilization, is not a factor, the inner and outer covers need only provide electrical insulation.

In various other embodiments, the inner covers are provided with apertures to permit the optical interconnection of blocks, and in some cases, the outer covers are provided with similar apertures for the transmission of optical energy.

All of the objects as set forth above are achieved in this invention, as described, in addition to other objects, features and advantages as will become apparent from the following detailed description thereof when taken in conjunction with the appended claims and the attached drawing wherein like reference numerals refer to like parts throughout the several figures and in which:

FIGURE 1 is an exploded view in perspective of one embodiment of the modular assembly of the invention showing the various components comprising the assembly and the manner in which they are assembled;

FIGURES 9–12 are perspective views illustrating various alternate embodiments of inner covers for housing functional electronic blocks, wherein FIGURES 9 and 10 are multicavity housings for accommodating a plurality of functional electronic blocks, and FIGURES 11 and 12 are housings adapted to hold functional electronic blocks which are to be optically interconnected with other circuitry;

FIGURE 13 is a perspective view of an alternate embodiment of a modular assembly similar to that shown in FIGURE 1; and FIGURES 14–16 illustrate various functional electronic block configurations for being housed within the modular assemblies.

Figure 5:
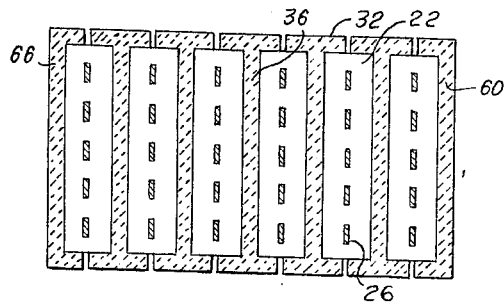
FIGURE 5 is an elevational view in section taken across lines 5—5 of FIGURE 1 and shows a plurality of functional electronic blocks assembled between insulating covers to form an interleaved subassembly.

Referring now to FIGURE 1, there is shown an exploded view of one embodiment of a modular assembly for packaging a plurality of functional electronic blocks therewithin. Shown generally at 20 is a typical functional electronic block, which is illustrated in perspective view. The electronic block comprises a main body portion 22 with electrodes 24 and 26 projecting, respectively, from the two opposite ends thereof. The main body portion 22 contains the electronic circuitry of the functional electronic block and can comprise an electronic circuit made up of individual components of classical design, such as individual transistors, diodes, resistors, chokes, etc., interconnected by wires, or can contain an electronic circuit which is integrated into a single unitary body, such as where the various components of the circuit are fabricated within a single piece of semiconductor material. For purposes of illustration only, the electronic block 20 is shown having five leads protruding from two opposite ends of a main body portion, the latter which has a parallelepiped configuration with a pair of opposing broad planar surfaces. It is to be noted, however, that other configurations of electronic blocks are readily adaptable to the modular assembly of the invention, as will be described hereinafter. The functional electronic block is normally quite small and miniature in size, whereby the major dimension of the block measures only fractions of an inch. Usually the electronic block is designed and fabricated to perform a desired electronic function such as that of an amplifier, multivibrator, oscillator, various logic functions, or one of many other electronic functions. Like other electronic circuits or individual components, the functional electronic block must be interconnected with other circuitry. In the case of electronic blocks of this type, they are often interconnected, with other functional electronic blocks to provide a combined electronic circuit comprised of a preselected combination of the several electronic functions provided by the various blocks, so that an entire system of miniature size can be provided.

Several of the functional electronic blocks are packaged into an assembly shown generally at 30, wherein the exact number of electronic blocks assembled and their particular functions are preselected as desired. The blocks are assembled between electrically insulating-thermally conducting covers 32 which are generally rectangular in shape and define recesses 34 in the opposing faces thereof, with a wall 36 separating the opposing recessed faces. The dimensions of the recesses are such as to just accommodate the functional electronic block when the latter is fitted therein. When a functional electronic block is fitted between two of the covers 32, portions of the block extend into each of the recesses of the two adjacent covers, and the depths of the recesses are such that the major opposing surfaces of the functional block engage the respective walls 36 of the opposing covers substantially uniformly over the surfaces thereof, with the electrodes of the blocks protruding from between the covers and being firmly engaged therebetween. Upper and lower angle brackets 40 and 41 are preattached along one endge of the side 38 of housing 32 and coincide, respectively, with the two extreme electrodes in the group 26 of a functional electronic block housed within one face of the cover. Upper and lower angle brackets 42 and 43 are preattached along an opposing edge of the side 38 and coincide, respectively, with the two extreme electrodes of an adjacent electronic block. Similar angle brackets are provided to the sides of the other covers so that opposing angle brackets embrace both sides of the extreme electrodes of the functional electronic blocks. Angle brackets (not shown) are also attached to the opposite sides of the inner covers and embrace the extreme electrodes in the group 24 of the blocks on the opposite side. The extreme electrodes are then secured to the angle brackets, such as, for example, by wrapping wire or spring 44 about the shoulder portions of the brackets and the electrodes. The assembly is then physically held together as a single unit with the blocks being held between the covers. Any other suitable means may be used to secure the assembly, such as the use of a sleeve, snap ring, wedge or other device about the brackets or by soldering. It should be pointed out that the outermost covers 60 and 66 of the assembly have recesses defined in only one surface thereof. These covers are equipped with a single pair of angle brackets on each side, whereas the inner covers are provided with two pair of angle brackets on each side. Thus, the functional electronic blocks are assembled within insulating covers and all of the components are held together by means of securing the various angle brackets to the extreme or outer electrodes of the electronic blocks.

Several advantages are provided by the subassembly structure 30. First, it is very easy to assemble the electronic blocks into this structure by the simple expedient of interleaving them with the electrically insulating-thermally conducting covers 32. Since the blocks are separated only by the thin walls 36 of the covers, this enables a high packaging density of electronic blocks. Moreover, after the outer electrodes are secured between the angle brackets, the entire subassembly is held together as a unit and may be easily handled for its subsequent interconnection with other circuit, or the interconnection between the various blocks encapsulated within the subassembly. The electrodes of the electronic blocks are firmly held in position by pressure applied by the rim surfaces of the covers, the pressure being applied as a result of the wire wrapping or spring climps provided about the shoulders of the angle brackets. The applied pressure holding technique has a threefold purpose. First, it allows easy replacement of a faulty functional electronic block by removing the wire wrap or other holding device. Secondly, it positions the functional electronic block electrodes with respect to the covers and subassembly, thus simplifying alignment for future circuit connections. Thirdly, it permits the covers to serve as a heat sink for the electrodes during future soldering operations and, therefore, prevent heat damage to the block. It should be noted that these pressure connections are for mechanical purposes and do not require low, ohmic contacts for electrical requirements.

After the functional electronic blocks are disposed and held between the covers to form the subassembly 30, outer covers designated generally at 70 and 90 are fitted against the subassembly along the two ends defined by end covers 60 and 66, respectively, and the two sides of the assembly from which the electrodes of the electronic blocks protrude. Referring specifically to the outer cover 70 which takes the form of a corner piece that covers one end and one side of the subassembly 30, the cover comprises a side wall portion 74 and an end wall portion 72 perpendicular thereto. Slots are provided in the side wall portion 74 so that the leads of the functional electronic block protruding from the one side of the subassembly coincide therewith and pass through the wall portion when the outer cover is positioned thereagainst.

Figure 2:
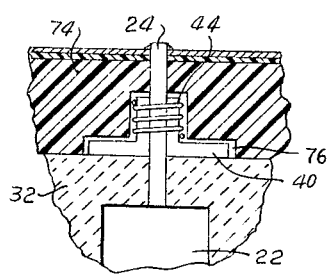
FIGURE 2 is a fragmentary section view taken across lines 2—2 of FIGURE 1 showing an electrode passing through an aperture in one of the outer covers of the assembly.

Since the upper and lower rows of leads on each side of the assembly 30 are disposed between the angle brackets, the upper and lower rows of slots 76 defined in the wall portion 74 are enlarged to accommodate both the leads and the angle brackets. This is more clearly seen in the sectional view of FIGURE 2 of one of the slots 76 taken across lines 2—2 of the side wall portion 74, where the wall at this location is recessed in configuration and depth to correspond to the angle bracket with the particular electrode of the electronic block passing completely through the wall. Each of the upper and lower rows of the slots in the wall portion are recessed in this manner to accommodate the additional widths of the angle brackets on the upper and lower rows of the electrodes of the electronic blocks. The interior slots 78 are not recessed in this manner, since no angle brackets need be accommodated at these locations, and only the interior electrodes of the blocks protrude from the subassembly to pass through the wall. When the outer covers 70 and 90 are fitted over the leads, the ends and wall portions thereof fit smoothly against the ends and walls of the subassembly 30. Similar slots 96 and 98 are provided in the other outer cover 90.

The end portion 72 of the outer cover 70 extends above and below the side wall portion 74 to provide a top portion 80 with a groove 82 cut laterally thereacross in the inner surface, and a bottom portion 84 having a groove 86 cut laterally there across in the inner surface. Similarly, the opposite outer cover 90 has extended top and bottom portions 100 and 104, respectively, with slots 102 and 106 cut laterally across the inner surfaces, respectively, of the top and bottom portions 100 and 104. A top cover 120, having tongues 122 and 124 on the opposite ends thereof, is fitted against the top of the subassembly 30 by sliding the tongues into the grooves 82 and 102, respectively, of the outer covers 70 and 90. Similarly, a bottom cover 126, having tongues 128 and 130, is fitted against the bottom of the subassembly 30 by threading the tongues within the slots 86 and 106, respectively, of the outer covers 70 and 90. This completes the physical enclosure of the modular assembly of this embodiment with the electrical connections to the various blocks to be described below. Actually, the top and bottom covers 120 and 126 are not absolutely essential unless it is desired to completely encapsulate the subassembly, such as the case where it is desirable to thermally insulate the subassembly from the ambient when the temperature control of the functional electronic blocks is undertaken with a further embodiment to be described later. However, the top and bottom covers have been shown here for purposes of illustrating how they are used to form a completely enclosed modular assembly.

Prefabricated circuits 140 and 150 also having slots defined therein to coincide with the electronic block electrodes are assembled onto the outer surfaces of the wall portions 74 and 94 of the two outer covers 70 and 90, respectively. These circuits can take the form of a conventional printed circuit board that forms the wall portions themselves, or is affixed to the outer surfaces of the wall portions, as shown. Alternatively, for example, the prefabricated circuits can take the form of a Mylar or other insulating film or layer that is metallized to provide conducting paths to which the block electrodes are electrically connected. In any event, the prefabricated circuit has defined on the outer surface thereof conducting paths to which the various electrodes are to be electrically connected. Thus, circuit board or sheet 150 has slots 96' and 98' which coincide, respectively, with upper and lower slots 96 and intermediate slots 98 of cover 90. Similarly, circuit sheet 140 has slots which coincide, respectively, with upper and lower slots 76 and intermediate slots 78 of cover 70. For purposes of illustration only, the circuit board 150 is shown with conducting paths 152 which form one particular configuration, where it can be seen that the conducting paths enclose selected slots defined through the outer cover. The circuit can be affixed to the outer surface of the cover either before or after the cover is positioned over the electrodes. Moreover, the circuit need not be firmly attached to the cover except as will be effected by the electrical connections thereto with the electrodes. The particular pattern of the conducting paths provided to the surface of the prefabricated circuit may be chosen as desired to establish any particular interconnection between the various electronic blocks. By using a thin insulating sheet such as Mylar, which is metallized in the desired configuration, the sheet may be discarded when disassembling the structure to replace a component with little cost consideration. Such prefabricated circuit patterns are very economical and a considerable inventory and variety can be stocked for a small cost.

The dimensions of the walls of the outer covers and the length of the electrodes are such that when the outer covers are fitted onto the sides and ends of the subassembly 30, the electrodes protrude through the slots and extend to only a small distance beyond the surface of the prefabricated circuit. Subsequently, the electrodes are welded or soldered to the conductors of the circuit with which they coincide, as more clearly seen in the perspective view of the completed assembly shown in FIGURE 4. As an example, the connection of the electrodes may be expediently effected by wave soldering, which is well known in the art.

Figure 3:
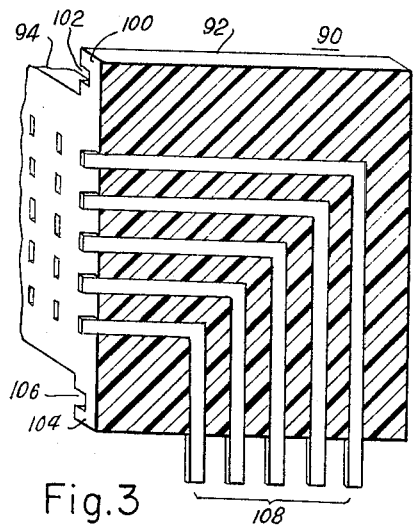
FIGURE 3 is a perspective view showing a sectional elevation of the end of one of the outer covers of the assembly of FIGURE 1.
Figure 4:
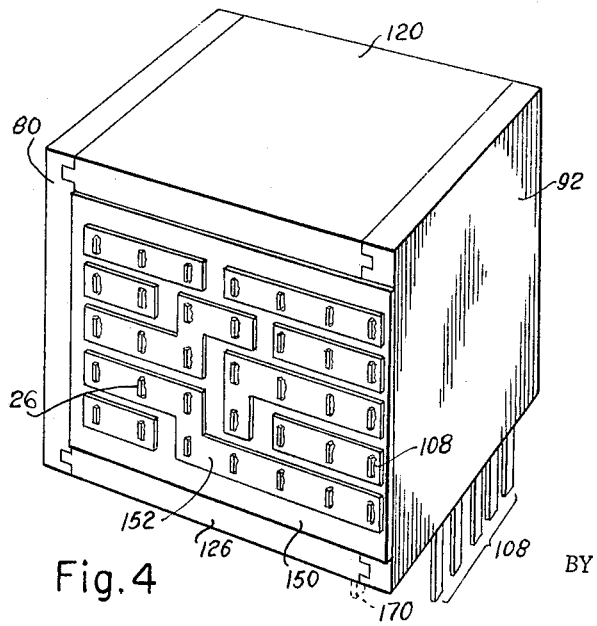
FIGURE 4 is a perspective view of the modular assembly of FIGURE 1 when the components are joined together.

Each of the outer covers is also equipped with electrodes which protrude from the bottom of the end portion thereof and also extend out of the edge of the end portion adjacent the corner of the cover. These electrodes are shown in the elevational sectional view of FIGURE 3 taken across lines 3—3 of the outer cover 90 shown in FIGURE 1. A plurality of electrodes 108 are encased within the end portion 92 and protrude out the bottom thereof and out the edge near the corner. The printed circuit sheet 150 is also provided with slots 99 coinciding with the electrodes 108 projecting out the edge, which provide the connections between the functional electronic blocks and the electrodes 108. Thus, when the leads of the functional electronic blocks are soldered or welded to the conducting paths of the circuit board 150, the electrodes 108 within the outer cover are also soldered to the conducting paths with which they are associated. The other outer cover 70 is similarly constructed with electrodes 88, which are connected to the circuit sheet 140. When all of the components of FIGURE 1 are assembled as described, a system is formed as shown in FIGURE 4 which is a module for performing an electrical function which can be plugged into a socket by means of electrodes 88 and 108, or soldered to other circuitry.

Figure 7:
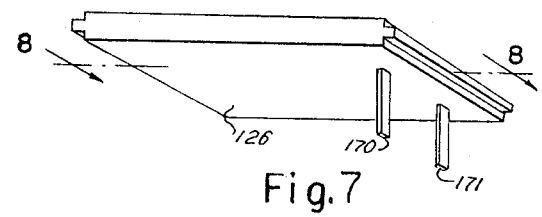
FIGURE 7 is a perspective view illustrating an alternate embodiment of one of the components of the assembly of FIGURE 1, and comprises means for the temperature control of the assembly.
Figure 8:
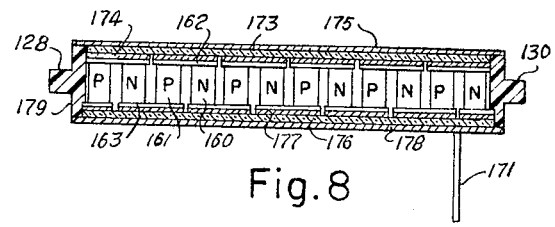
FIGURE 8 is an elevational view in section taken across lines 8—8 of FIGURE 7, and shows a thermoelectric cooler and/or heater housed within this component.
Figure 6:
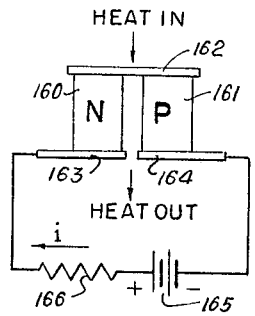
FIGURE 6 is an electrical schematic diagram of a thermoelectric cooler and/or heater.

The subassembly 30 is shown in more detail in FIGURE 5, which is an elevational view in section taken across lines 5—5 of FIGURE 1. Each of the electronic blocks 22 are engaged over their surfaces by walls 36 of the inner covers 32, with the blocks being interleaved between opposing covers. The edges of adjacent covers are separated only by a sufficient amount to enable the electrodes 24 and 26 to protrude from the recesses. To prevent electrical shorting between the several functional electronic blocks, the interior covers are comprised of an electrically insulating material. If the electronic blocks do not generate an excessive amount of heat, then any electrical insulating material is suitable which has a minimum amount of structural strength. Because of the high density packaging of blocks made available, it is desirable, under certain circumstances, to provide means for dissipating heat from the assembly, or even heating the assembly or providing temperature stabilization thereof. To effect heat transfer in and out of the assembly as desired, the invention provides, in a further embodiment thereof, a thermoelectric cooler disposed within the interior of the lower cover 126. The thermoelectric cooler, as is well known in the art, comprises a thermocouple for providing a cooling effect at one of the junctions and a heating effect at the other junction. To provide a considerable cooling and heating capacity, the thermocouple is comprised of selected semiconductor materials which have been found to have a relatively high Seebeck coefficient, high electrical conductivity and low thermal conductivity. In addition, a plurality of thermocouples are normally used in combination as will be described in order to handle greater heat loads. A typical thermocouple is shown in the electrical schematic diagram of FIGURE 6 and comprises an n-type conductivity semiconductor leg 160 and a p-type conductivity semiconductor leg 161 electrically conected thereto at one end by means of contact 162. This contact is considered as one junction of the thermocouple. Contacts 163 and 164 are provided to the other ends of the legs 160 and 161, respectively, which are interconnected with a direct current source or battery 165 through a limiting resistor 166. These contacts represent the other junction of the thermocouple. With the battery polarity connected as shown (positive terminal connected to n-type leg), the curent direction through the junctions is such as to cause a cooling effect at junction 162 and a heating effect at junction 163–164, with a temperature gradient being maintained between the junctions. Thus, the thermocouple acts as a heat pump to withdraw heat from junction 162 and give the heat up at junction 163–164. Reversal of the battery polarity reverses this effect. All of this is well known in the art, including the theories behind optimum operating conditions for particular heat loads. In order to create as large a thermoelectric effect as possible, certain semiconductor materials have been found to be best, such as, for example, n and p-type bismuth-telluride. Others are available which are well known. To provide an increased heating and cooling capacity, a plurality of thermocouples are combined either in electrical series or parallel. The thermoelectric cooler (or heater as the case may be according to the battery polarity) is encapsulated within the bottom cover 126 with electrodes 170 and 171 protruding from the bottom thereof for interconnection with a current source for operating the thermocouples, as shown in FIGURE 7. In one embodiment, a plurality of thermocouples are connected in electrical series to provide an increased cooling and/or heating capacity as shown in the elevational view of FIGURE 8 taken in section across lines 8—8 of FIGURE 7. Alternate p and n-type legs are connected together with all of the cooling junctions being disposed adjacent one surface of the cover, and all of the heating junctions being disposed adjacent the other surface. The cover 126 in this case is preferably comprised of a top plate 173 comprised of an electrical insulator which is also a good thermal conductor, such as beryllium-oxide, for example, having a metallized layer 175 on the top surface and having selected metallized areas 174 on the bottom side to correspond to the thermocouple junctions. Similarly, a bottom plate 176 has a metallized outer surface 178 and selectively metallized portions 177 on the inner surface to correspond to the lower thermocouple junctions. The cover is enclosed at the periphery with a wall 179 comprised of ceramic or plastic, as desired. Thus, the thermocouples may be soldered directly to the upper and lower cover plates, with air or an insulator, as desired, surrounding the thermocouple legs. When the bottom cover 126 is fitted adjacent the subassembly 30, the top surface of the bottom cover can be soldered to the subassembly should it also be metallized and will be in thermal contact therewith and will act as a heat pump to withdraw or add heat from the subassembly in response to current flow through the thermocouples, depending upon the current polarity. Under most circumstances, heat will be withdrawn from the subassembly to maintain the temperature thereof within the proper operating range. In fact, it is quite easy to maintain the temperature of the subassembly below that of the ambient because of the temperature gradient effect that can be established between the hot and cold junctions of the thermocouples. Such a gradient is not possible by merely providing a good heat conduction path, and, in fact, an opposite gradient will result. The complete assembly is again shown in FIGURE 4, but with the additional electrodes 170 and 171 protruding from the bottom cover, as shown by electrode 170 drawn in phantom. When the assembly is installed for operation, the bottom surface of the bottom cover is placed in good thermal contact with a heat sink. In addition to cooling, the thermocouple system can be used to heat the subassembly or to maintain temperature stabilization through both heating and cooling.

When the heat pump just described is used in conjunction with the system, the material comprising the inner covers is desirably a good thermal conductor, which also provides electrical insulation between adjacent blocks. Several materials are available which are suitable for this purpose, such as, for example, aluminum-oxide ceramic ($Al_2O_3$), commonly known as alumina, or variations thereof, beryllium-oxide (BeO) or variations thereof, and aluminum metal which is anodized to provide a thin insulating cover thereon. To insulate the subassembly 30 from the ambient so that the heat pump is cooling or heating only the subassembly, the outer covers, including the top and bottom covers, are preferably comprised of good thermal insulating materials, in addition to being electrical insulators. Suitable materials for this purpose are most plastics and epoxys.

The modular assembly of the invention can be modified in other embodiments to increase its versatility for handling additional functional electronic blocks. For example, it is desirable in certain instances to accommodate two or more functional electronic blocks between each adjacent pair of inner covers, such as shown in the additional embodiments of the multicavity units of FIGURES 9 and 10. One embodiment of a multicavity unit is shown in FIGURE 9 and is adapted to accommodate two functional electronic blocks. The bi-cavity unit 180 defines two recesses 182 and 184 in one surface thereof separated by a web portion 185. Angle brackets 186 and 187 are attached to one edge of the unit 180 which correspond, respectively, to the upper electrode on one side of a functional electronic block to be disposed within the recess 182 and the lower electrode on one side of a functional electronic block to be disposed in the other cavity 184. Similarly, angle brackets 188 and 189 are attached to the opposite edge of the unit 180 to correspond with the upper and lower electodes, respectively, of the two blocks which project out the other side of the unit. A similar cover unit is provided to cover the other surfaces of the functional electronic blocks and as many layers as desired are used to build up a subassembly as previously described. Otherwise, the assembly is the same as that shown in and described in FIGURE 1.

A further embodiment of a multicavity cover unit is shown in FIGURE 10 and comprises a cover unit 190 defining four cavities 192, 194, 196 and 198. Cavities 192 and 194 are separated by a web portion 199, and cavities 196 and 198 are separated by a web portion 200, with web portions 201 and 202 separating the cavities 194 and 198, and 192 and 196, respectively. This multi-cavity cover unit is designed to accommodate functional electronic blocks having, for example, leads extending out of only one side thereof. Angle brackets 203 and 204 are attached to one edge of the cover unit to correspond with the upper and lower electrodes, respectively, of the two electronic blocks disposed within the recesses 192 and 196. Similarly, angle brackets 205 and 206 are attached to the other edge of the unit to correspond to the upper and lower electrodes, respectively, of the electronic blocks disposed within recesses 194 and 198. Many other variations in the number and location of the various recesses or cavities are possible to accommodate different numbers and configurations of functional electronic blocks to be incorporated within a modular assembly. Thus, the embodiments shown in FIGURES 9 and 10 are shown for illustrative purposes only and should not be considered as limiting on the invention.

Functional electronic blocks are sometimes equipped with optical radiation generating means and/or photosensitive detector means, primarily for the purpose of providing complete electrical isolation between various functional electronic blocks while providing the necessary interconnection means therefor. For example, optical radiation generated by one functional electronic block in response to an electrical signal and received by photosensitive means located within another functional electronic block will provide the necessary electrical intercoupling means between functional electronic blocks and yet provide complete electrical isolation. To provide for the optical interconnection of functional electronic blocks within the modular assembly of the invention, suitable apertures are provided within the inner covers of the assembly in the proper locations to permit the transmission of the optical radiation. Referring to FIGURE 11, there is shown, for illustrative purposes only, one embodiment of an inner cover 220 defining a pair of adjacent recesses 222 and 224 separated by a web portion 225. An aperture or opening 226 is provided in the web portion 225 to permit the transmission of optical radiation therethrough. Another cover of similar construction, not shown, is used in conjunction with the cover 220, and a functional electronic block (not shown) with radiation generating means is fitted within the recess 224 so that the radiation source coincides with the aperture 226. Another functional electronic block (not shown) having a radiation sensitive detector means is situated within the recess 222 with the detector means coinciding with aperture 226 and being optically aligned therewith. The opposing cover, not shown, is then fitted over the two functional electronic blocks, and the electrodes protruding from the blocks can be interconnected with other circuitry through the assembly package as shown and described with reference to FIGURE 1. In the case where the functional block disposed in cavity 222 also has radiation generating means for directing radiation out from one side thereof, for example, another aperture 227 is provided in the end edge of the cover to permit the transmission of the optical radiation beyond the cover. This embodiment is shown for illustrative purposes only wherein a multi-cavity cover has been described. However, the cover could just as well contain only one recess with the aperture or apertures being provided to permit the transmission of optical radiation in different directions. One such embodiment is shown for illustrative purposes in FIGURE 12 and comprises a cover 238 defining a recess in at least one side thereof with a functional electronic block 231 fitted within the recess. In this instance, the block contains an optical radiation generating means 236 for directing radiation from one of the broad surfaces of the block, and also has groups of electrodes 232 and 234 protruding from two of the edges thereof. Another cover 240 defining a recess in the surface facing the functional electronic block is fitted against the block 231 in the same manner as the assembly of FIGURE 1. An aperture 242 is provided in the cover 240 so that the radiation generated by the block 231 can pass therethrough and be received by a photosensitive detector located within another functional electronic block or other circuit. The cover 240 can also define an additional recess in its surface opposite the block 231 for housing an additional block which contains a photosensitive detector.

The embodiments described with reference to FIGURES 11 and 12 relate to the inner covers used to incapsulate the functional electronic blocks to form a subassembly similar to that shown in FIGURE 1. Once assembled, the outer covers are attached to the subassembly to form a completed modular assembly such as shown in FIGURE 13. The complete modular assembly comprises the subassembly, not shown, enclosed within outer covers 254 and 256 and top and bottom covers 260 and 258. The side wall portion of the outer cover 256 is covered with a circuit sheet 260 with the various electrical connections made thereto as previously described. Should it be necessary for the modular assembly to transmit to or receive optical radiation from an external detector or source to provide complete electrical isolation with another modular assembly, for example, then apertures or radiation transmitting windows must be provided. There is shown, for illustrative purposes only, an aperture 262 located within the end wall portion of outer cover 256 so that radiation can be transmitted into or out of the aperture for optical coupling with one or more of the functional electronic blocks disposed within the subassembly. An additional aperture 264 is also shown located in the top cover 260 for the transmission of optical radiation therethrough should this be necessary. These apertures can be situated at any desired location on the modular assembly, in addition to which more or less apertures can be provided. The embodiment of FIGURE 13 is shown, however, for the purposes of illustrating the versatility of the modular assembly.

Examples of various embodiments and designs of functional electronic blocks that are being manufactured and in which the modular assembly of the invention can be adapted are shown in FIGURES 14–16. For example, there is shown in FIGURE 14 a functional electronic block 270 having leads or electrodes 272 projecting from a single edge thereof. A different configuration is shown in FIGURE 15 where a functional electronic block 274 has electrodes 275 projecting from one edge, electrodes 276 projecting from an opposite edge, and electrodes 277 projecting from an intermediate edge. A functional electronic block 280, such as shown in FIGURE 16, has electrodes 281, 282, 283 and 284 projecting from all four edges, respectively. Any one or all of these embodiments, including others, can be used in conjunction with the modular assembly of the invention by providing the proper inner covers which incapsulate the blocks and the proper printed circuits for interconnecting the various leads.

Although the invention has been described with reference to certain embodiments thereof, many other variations, including other advantages and features, that do not depart from the true scope of the invention will undoubtedly become apparent to those skilled in the art, and it is intended that the invention be limited only as defined in the appended claims.

What is claimed is:
1. A modular assembly for functional electronic blocks, comprising:
  (a) a plurality of rigid inner cover members arranged in a row,
  (b) a plurality of functional electronic blocks interleaved between said plurality of inner cover members,
  (c) said plurality of electronic blocks having electrodes depending therefrom and protruding from between adjacent cover members beyond the edges thereof,
  (d) each of said plurality of cover members having portions extending from said edges which are adjacent to at least some of said electrodes of said blocks adjacent thereto,
  (e) fastening means for securing said at least some of said electrodes to said portions which are adjacent thereto for holding said plurality of cover members and said plurality of electronic blocks together as a unit,
  (f) an outer cover member defining a plurality of apertures therethrough coinciding with at least some of said electrodes disposed along a first surface thereof against a first side of said unit with said at least some of said electrodes passing through said plurality of apertures coinciding respectively therewith,
  (g) electrically conducting means disposed on a second surface of said outer cover member opposite said first surface adjacent to said plurality of apertures for interconnecting said at least some of said electrodes according to a predetermined scheme, and
  (h) an additional outer cover member disposed along a surface thereof against another side of said unit having thermal means for controlling heat flow in and out of said unit.

2. A modular assembly as set forth in claim 1 wherein said thermal means comprises thermoelectric means for controlling said heat flow in response to an electric current.

3. A modular assembly for functional electronic blocks, comprising:
  (a) a plurality of rigid inner cover members arranged in a row,
  (b) a plurality of functional electronic blocks interleaved between said plurality of inner cover members,
  (c) said plurality of electronic blocks having electrodes depending therefrom and protruding from between adjacent cover members beyond the edges thereof,
  (d) each of said plurality of cover members having portions extending from said edges which are adjacent to at least some of said electrodes of said blocks adjacent thereto,
  (e) fastening means for securing said at least some of said electrodes to said portions which are adjacent thereto for holding said plurality of inner cover members and said plurality of electronic blocks together as a unit,
  (f) an outer cover member defining a plurality of apertures therethrough coinciding with at least some of said electrodes disposed along a first surface thereof against a first side of said unit with said at least some of said electrodes passing through said plurality of apertures coinciding respectively therewith, and (g) electrically conducting means disposed on a second surface of said outer cover member opposite said first surface adjacent said plurality of apertures of interconnecting said at least some of said electrodes according to a predetermined scheme, (h) said outer cover member including a plurality of electrodes protruding therefrom which are electrically connected to selected ones of said electrodes of said functional electronic blocks by means of said electrically conducting means.

4. A modular assembly for functional electronic blocks, comprising:

(a) a plurality of rigid inner cover members arranged in a row, (b) a plurality of functional electronic blocks interleaved between said plurality of said inner cover members, (c) said plurality of electronic blocks having electrodes depending therefrom and protruding from between adjacent cover members beyond the edges thereof, (d) each of said plurality of cover members having portions extending from said edges which are adjacent to at least some of said electrodes of said blocks adjacent thereto, (e) fastening means for securing said at least some of said electrodes to said portions which are adjacent thereto for holding said plurality of inner cover members and said plurality of electronic blocks together as a unit, (f) an outer cover member defining a plurality of apertures therethrough coinciding with at least some of said electrodes disposed along a first surface thereof against a first side of said unit with said at least some of said electrodes passing through said plurality of apertures coinciding respectively therewith, and (g) electrically conducting means disposed on a second surface of said outer cover member opposite said first surface for interconnecting said at least some of said electrodes according to a predetermined scheme, (h) said electrically conducting means including a plurality of separate, spaced apart conductors disposed adjacent selected ones of said apertures for selectively interconnecting said electrodes which pass pass through said apertures, (i) said outer cover member including a plurality of electrodes protruding therefrom which are electrically connected to selected ones of said plurality of conducting members.

5. A modular assembly for functional electronic blocks, comprising:

(a) a plurality of electrically insulating, thermally conducting rigid inner cover members arranged in a row, (b) a plurality of functional electronic blocks interleaved between said plurality of inner cover members in thermal contact therewith, (c) said plurality of electronic blocks having electrodes depending therefrom and protruding from between adjacent cover members beyond the edges thereof, (d) each of said plurality of cover members having portions extending from said edges which are adjacent to at least some electrodes of said blocks adjacent thereto, (e) fastening means for securing said at least some of said electrodes to said portions which are adjacent thereto for holding said plurality of cover members and said plurality of electronic blocks together as a unit, (f) a first outer cover member disposed along a surface thereof against a first side of said unit and including thermal means for controlling heat flow in and out of said unit, and (g) a plurality of additional electrically and thermally insulating outer cover members disposed against the remaining sides of said unit to completely enclose said unit in conjunction with said first outer cover member, (h) at least one said additional outer cover member defining a plurality of apertures therethrough coinciding to at least some of said electrodes with said at least some of said electrodes passing through said plurality of apertures coinciding respectively therewith, (i) said at least one of said additional outer cover members including electrically conducting means disposed adjacent said plurality of apertures for interconnecting said at least some of said electrodes according to a predetermined scheme.

6. A modular assembly as set forth in claim 5 wherein at least one of said additional outer cover members and at least one of said inner cover members adjacent thereto define coinciding optically transparent apertures exposing a portion of the functional electronic block adjacent said at least one of said inner cover members.

7. A modular assembly as set forth in claim 5 wherein at least one of said additional outer cover members defines at least two optically transparent apertures therethrough and at least one of said inner cover members adjacent said at least one of said additional outer cover members defines at least two optically transparent apertures therethrough coinciding, respectively, with said at least two apertures of said outer cover member, exposing portions of at least one of said plurality of functional electronic blocks.

References Cited by the Examiner

UNITED STATES PATENTS

| | | | |
|---|---|---|---|
| 2,995,686 | 8/1961 | Selvin | 317—101 |
| 3,002,045 | 9/1961 | Ayer | 174—88 |
| 3,187,226 | 6/1965 | Kates | 317—100 |

FOREIGN PATENTS 1,138,441  10/1962  Germany.

OTHER REFERENCES

Electronics: May 13, 1960, p. 78.

ROBERT K. SCHAEFER, *Primary Examiner.*

KATHLEEN H. CLAFFY, ROBERT S. MACON,
*Examiners.*

J. J. BOSCO, *Assistant Examiner.*